Nov. 26, 1929.

A. B. HURLEY

METHOD OF PREVENTING EYE FATIGUE

Filed July 15, 1925

Re. 17,502

2 Sheets-Sheet 1

WHITE BACKGROUND

OVER INTENSITY

TINTED BACKGROUND
30% WHITE DILUTED

UNDER INTENSITY

SCREEN BACKGROUND
30% WHITE DILUTED
25% PURE WHITE SURFACE

BALANCED INTENSITY

INVENTOR.

Albert B. Hurley

BY

Edward E. Clement

ATTORNEY.

Nov. 26, 1929.
A. B. HURLEY
METHOD OF PREVENTING EYE FATIGUE
Filed July 15, 1925
Re. 17,502
2 Sheets-Sheet 2
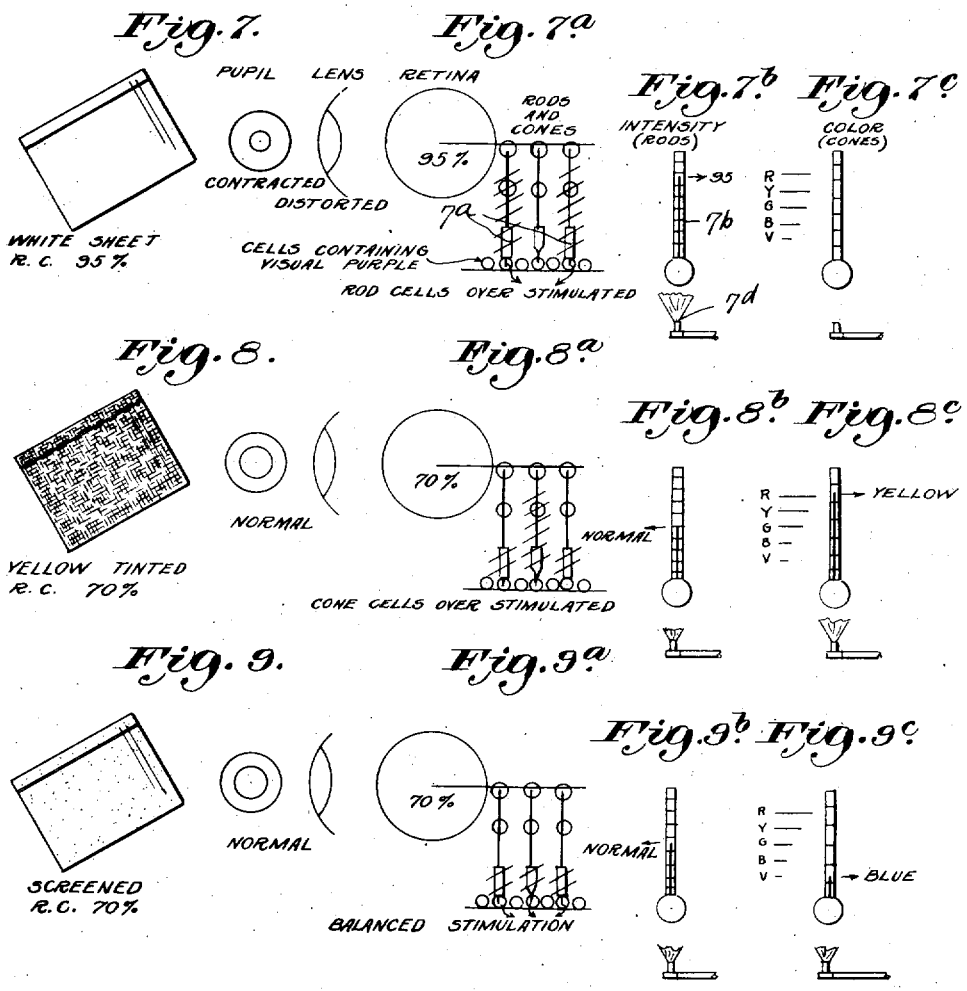
Inventor
Alan B. Hurley
By Edward E. Clement
Attorney Reissued Nov. 26, 1929

Re. 17,502

UNITED STATES PATENT OFFICE

ALBERT B. HURLEY, OF NEW YORK, N. Y., ASSIGNOR, BY MESNE ASSIGNMENTS, TO NATIONAL PAPER PROCESS COMPANY, OF NEW YORK, N. Y., A CORPORATION OF DELAWARE

METHOD OF PREVENTING EYE FATIGUE

Original No. 1,659,952, dated February 21, 1928, Serial No. 43,880, filed July 15, 1925. Application for reissue filed February 21, 1929. Serial No. 341,853.

My invention relates to the art of optics and particularly to the application of certain principles of balanced colors and balanced intensities with respect to their physiological effect on the eye and the resultant effect on the nervous system. It has for its object to produce a method of relieving nerve tension and lessening or preventing fatigue of the eyes by regulating the color and intensity of light, thrown off from illuminated surfaces, without changing the physiological effect of the same upon the eyes and therethrough on the mind of the observer This application is a continuation in part of my prior copending application, Serial Number 732,775, filed August 18, 1924, in so far as the use of a color grid for a background is concerned; but it is to be noted that said application is limited to the use of such background on playing cards, whereas the present application is intended to cover a separate invention or discovery by virtue of which the usefulness of the first invention is greatly broadened, becoming applicable to all surfaces, whether backgrounds or not, which have as a part of their function the production of physiological effects upon the eye, that is to say, the reflection of light for that purpose.

I attain my object, by dividing a light transmitting surface into uniformly distributed spots or squares of uniform areas, one set constituting the color filter and the other set being adapted to reflect light of the base or surface color, usually assumed to be white. By regulating the relative sizes of the grid or filter and the exposed background spaces, the amount of direct reflection of color or white light may be determined, as well as the amount of subdued or filtered light intermixed therewith. As a specific embodiment of my invention, I use a light filter or screen, for reflecting surfaces which are not required to reflect the full effect of high illumination, and I arrange this filter or screen so that only a certain percentage of light may be reflected from said surfaces. I have found that by regulating the amount of light that is reflected, the stimulation due thereto can be increased or reduced to any desired degree, without affecting the color sensation of white light, due to the intermixture with the modified or softened light, of a certain percentage of pure white light. The production of the effect can be aided by employing a color screen to function either in the place of or together with the light filter, and by these means regulating the percentage of pure white light that is reflected.

In my prior application, I described and claimed a proportion of 3 to 1 as between the tinted grid areas and the white light areas, the grid being of a fineness of between 80 to 100 mesh per inch. The basis of the present application, is my discovery that not only can the principle involved in the earlier application be advantageously applied to light transmitting surfaces in general, but also that the formation of the color screen or grid as a perfect checker-board results in better subdivision of the light, the percentages of tinted and white rays respectively being then 50—50 of the whole while the amount of absorption in the tinted or color filter areas determines the color of the rays thrown off, and also the percentage of the white light mixed therewith, which I term dilution. If the color grid squares be black for perfect absorption, then we would have 50 per cent white rays thrown off. Since I use a fineness of about 85 mesh to the inch, this would appear as a rather dark gray. If, however, the color filter be made absorptive only for the red and some of the yellow rays, then we should have blue-green, which is easily diluted with more or less white, or in common parlance is easily made deeper or lighter in tone. In the application of my discovery I am not limited to blue or blue-green, but may modify the absorptive properties of my filter to receive or reject, that is to say, to absorb or reflect, or if a transmitting body, to transmit or reject, any of the colors of the spectrum. For the purpose of relieving the eye, however, I prefer to omit red and a larger part of the yellow.

As stated in my prior application hereinbefore referred to, the terminology of color is not yet standardized and the following definitions are followed for the terms hue, saturation, and brightness, as used with reference to my invention. By hue is meant the color itself, as suggested by its name. The saturation or purity is a measure of the relative of white in the color mixture. On diluting a color with white, tints are obtained; that is tints are unsaturated colors. By brightness is meant the degree of intensity of illumination, which can be found by comparing it by means of a photometer with a surface of known brightness, its reflection coefficient for a standard white light being taken into account in comparing it with other colors in this respect. (See Luckiesh "Color and its Applications", New York, D. Van Nostrand, 1921).

As a corollary to my first proposition of regulation whereby a light transmitting surface is caused to reflect a certain percentage of uniformly distributed white light, and to suppress certain uniformly distributed waves by means of a color filter of the type described, it may be stated that the light transmitting surface or medium such as paper will also transmit a certain percentage of uniformly distributed white light, and will suppress certain other percentages of uniformly distributed light waves so that the total amount transmitted is less than it would be with white light covering the entire surface.

My invention is illustrated in the accompanying drawings, in which.

Figure 4:
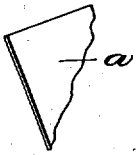
Fig. 4 is a fragment of a pure white surface.
Figure 4A:
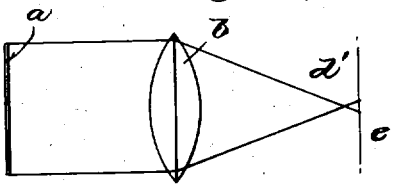

Fig. $4^a$ is a diagram illustrating the effect on the eye of the light rays reflected from Fig. 4.

Figure 5:
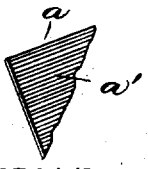
Figure 5A:
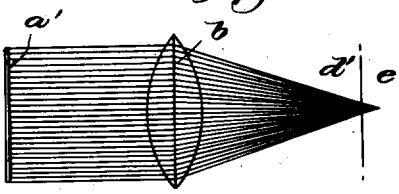

Fig. 5 is a fragment of a tinted surface.

Fig. $5^a$ is a diagram illustrating the effect on the eye of the light rays reflected from Fig. 5.

Figure 6:
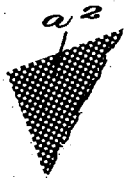
Figure 6A:
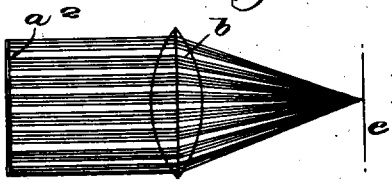

Fig. 6 is a fragment of a surface bearing a color screen or grid, according to my present invention.

Fig. $6^a$ is a diagram illustrating the effect on the eye of the light rays reflected from Fig. 6.

Figs. 7, $7^a$, $7^b$, $7^c$, 8, $8^a$, $8^b$, $8^c$, 9, $9^a$, $9^b$ and $9^c$ are diagrams showing the comparative effects of white, yellow and partly screened surfaces.

Figure 1:
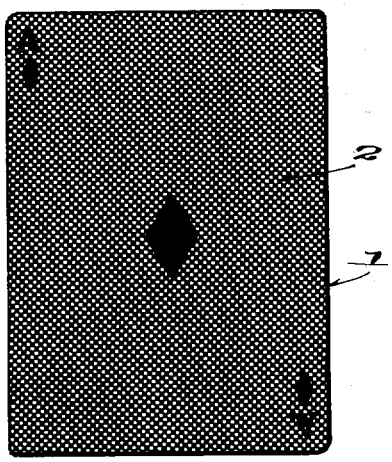
Fig. 1 shows a surface treated to break up and subdivide the reflected light, filtering out longer waves from part thereof, the subdivisions of the surface being represented on an enlarged scale for Patent Office purposes.
Figure 2:
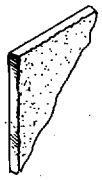
Fig. 2 shows an enlarged fragment of a surface treated to diffuse the reflected light.
Figure 3:
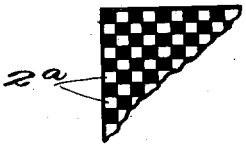
Fig. 3 is an enlarged fragment of a surface having mixed absorption dots to produce the same result as Fig. 1.

The filter medium may be constructed in several ways, all based on the same principles as shown in Figs. 1, 2 and 3, but what now seems to be the best way is illustrated in Fig. 1 wherein I have shown a surface 1 having applied to it a grid or checkerboard of light absorbing members 2, which are preferably arranged with their corners touching so as to leave small open squares $2^a$ of natural or white surface. The dimensions of each of the members 2, and the number of these to the unit of surface determine the dimensions of the enclosed squares $2^a$ and therefore the percentage of pure light which will be reflected according to the color of the natural surface. This surface is assumed to be white, which means that the percentage of pure white light reflected can be accurately controlled to produce a proper degree of stimulation of the controlling nerve centers which regulate the iris or aperture of the eye.

Another way of making the screen or filter shown in Fig. 3 is by producing upon the reflecting surface a mixture or mosaic of white spots. If the light absorbing spots are in the same relative proportions as the grid and the squares in the grid of Fig. 1, the result will be the same, i. e. a 50—50 per cent division in area with the checkerboard effect. A relative measure of fineness is the photoengraver's screen mesh, and I have found that in either case dimensions corresponding to those of 65 to 100 mesh produce satisfactory results.

Any objects on a surface thus treated are unaltered, as the normal coefficient of reflection applies to each one according to its own hue, saturation and brightness. It is to be recalled that calendered paper or playing-card board is glazed, and even an unglazed surface if perfectly white has a very high coefficient of reflection, reaching .90 or .95.

A color filter which may be employed in the practice of this invention is one which absorbs practically all the red rays and a considerable proportion of the yellow rays, so that the reflected rays produce the effect of bluish green or greenish blue. The white light reflected from the squares affects this in the following manner: Under moderate illumination by white light, which may be assumed to include good artificial illumination if there is any adjacent white surface to furnish a contrast, the treated surface will appear faintly tinted but with a "depth" or "life" which is lacking in the ordinary tint. Exposed to strong or high illumination and particularly if removed from propinquity to the white surface, the impression of color vanishes, and the mental impression of pure white light is produced, while the strength of the stimulus is reduced well below the point of retinal fatigue or failure of the iris muscles to act, or so called dazzling. This effect can be confirmed by holding the surface under test in a fixed position under high illumination and moving a perfectly white surface toward it. The eye at once responds to the higher stimulus due to the increased amount of white light and the mental impression of color or shade is produced by comparison with respect to the white surface. As the white surface is then moved away, all impression of color vanishes and within a period varying with the degree of over stimulation, the mental impression again becomes that of pure white light.

For the specific purpose of regulating brightness of the reflected light, the same may be diffused by somewhat breaking the surface, as indicated in Fig. 2. One reason for using this means is to compensate for the glaze. It is not essential to the practice of the invention.

Figs. 4, 5 and 6 show fragments of surfaces with their backgrounds "white", "tinted" and "screened" respectively and the corresponding Figs. $4^a$, $5^a$, and $6^a$ are diagrams illustrating the respective effects of light rays transmitted from the surfaces shown in Figs. 4, 5 and 6. In Fig. 4, *a* is the white background; an edge view of which is shown in Fig. $4^a$. The rays of light transmitted therefrom make for an over-intensity, so that the image is not clear upon the retina but as indicated symbolically at *d'*, is improperly received by the retina.

In Fig. 5, *a* is the surface, having a background *a'* tinted blue-green 30% white diluted. This tint although overcoming the fault of the surface of Fig. 4, that is, the resultant over-intensity, results in the opposite fault of under-intensity, as is symbolized in Fig. $5^a$. The rays are transmitted from surface *a* and passed to the lens *b* and from thence toward the retina *e*, but the transmitting surface being tinted in the aforesaid manner the image is not clear upon the retina, but as indicated symbolically at *d'* is improperly received by the retina.

In Fig. 6, the background is shown with a pure white surface partially covered by a screen or grid $a^2$, shown in the figure greatly enlarged. In practice the individual members of this screen or grid are not perceptible to the naked eye, being of such dimensions as to leave 50% of the pure white surface exposed, which of course will reflect pure white light. The screen constitutes a color filter, which I may make of a tint known in the trade as blue green 30% white diluted. Hence those parts of the surface which are covered by the screen or grid reflect only pale blue green light. The effect of this tinted grid with its enclosed and distributed white spaces is to produce a fine mosaic or checkerboard effect of mingled white and tinted spots, the white light remaining however undiluted by the tinted light, and producing the effect on the retina and the proper stimulus to adjustment of the iris lens, due to white light in the quantity thus transmitted. I have found in actual practice, using the photoengraver's screen mesh as a standard of measurement, that a grid or color filter $a^2$ of the tint mentioned, with its grid and enclosed white squares equal in dimensions, and of a fineness between eighty-five and a hundred per inch, is suitable for my purpose.

It has been found that there is practically no difference in visual acuity when detail is viewed against a white ground and a ground consisting of yellow copy paper, and measurements show only a slight difference in the brightness of yellow paper as compared with white, both receiving the same intensity of illumination. "After reading from white paper the eyes seem to welcome a change to yellow", writes Luckeish, who does not state positively but says, "this may be due to a decrease in contrast owing to the lower reflection co-efficient of the yellow paper".

There is practically no data on the influence of color on eye fatigue, although it is known that colors are of influence psychologically, and in this sense yellow is certainly not a color conducive to relief of nerve tension. It is will known that the eye is easily fatigued by any one color as well as it is by an over-intensity of white. If the eye would be relieved by a yellow sheet only after the use of a white sheet in which there is too great a co-efficient of reflection, then after the use of yellow it would be relieved from color fatigue by the white sheet.

That attempts have been made to relieve eye fatigue by decreasing the reflection co-efficient of a paper surface is obvious in the proposed use of yellow paper. There is a necessity for simultaneous contrast of a color that will give visual acuity of detail with the black or blue ink used and it is again obvious that color of a longer wave length than blue would be used. Yellow or buff is the only color that gives the required contrast but we know there is no psychological or physiological reason for its use.

From the above I find that an ideal ledger paper sheet should be white, but should have a reflection co-efficient less than white, without perception of color. It should have a reflection co-efficient or intensity of a strength that would give proper stimulus for easy perception at the same time registering below the point of retinal fatigue.

I attain this object without perception of color to the eye, by screening the white surface as herein described to decrease the pure white light reflected, the screen absorbing some or all of the longer waves and reflecting a tone of a wave length below that of the yellow or green. The surface so treated under low illumination will appear a faint blue. Under ordinary illumination the faint tint of blue will be noticed only on first vision. After co-ordination of the process of the eye all perception of color will vanish the same as if the surface were exposed to high illumination, under which at all times no color would be perceived.

Before comparing the advantages and disadvantages of the white, the yellow or the screened ledger sheet, we must first understand the processes of the eye and give credence to at least one theory of color vision. Light enters the eye through the pupil which contracts or dilates according to the intensity thereof. The crystalline lens then must focus the rays on the retina to give perception of form and outline. Rays of light consist of waves of different length which act in vibratory manner on the retina, producing impulses that stimulate the optic nerve which in turn transmits the stimulus to the brain for perception. The retina is composed of eight layers of which the most important and essential are the layers of nerve cells and the rods and cones. The rods are sensitive to light waves only as light and dark without hue. The cones are sensitive to the various wave lengths both as light and differentiated colors. Light falling upon the retina excites the rod cells, if the length of the wave has a corresponding color value, the rod cells liberate the visual purple which strains the cone cells and a visual color impulse is conveyed through the optice nerve to the brain.

In Figs. 7, 8 and 10, I show a comparison of the white, yellow and screened surface. The action of the light waves on the rod and cone cells and the consequent nerve impulses is compared to that of the heat energy of a flame under a thermometer. Two such symbolic thermometers are shown in the drawings. One of these is used to simulate the rod cells, showing intensity, and is normal at 70 degrees, while the other one, for cone cells, shows the effect of color waves is normal at 0 or twilight.

The light from a white surface having a reflection co-efficient of 90–95% under ordinary illumination, would tend to contract the pupil of the eye and distort the lens as shown in Fig. 7 but this is overcome by an effort at co-ordination by the ciliary process with resultant nerve tension and fatigue. The rod cells of the retina $7^a$ are over stimulated by this intensity as indicated by thermometer $7^b$, registering 95% as compared with normal of 70. The high flame $7^d$ and consequent heat energy expended is as the fatigue induced by high nerve tension. The cone cells are inactive, explaining why the eye seems to be relieved by the yellow sheet. However such relief woud be only temporary for the cone cells are only one-third the number of rod cells and more easily fatigued.

A yellow sheet Fig. 8 would decrease the reflection coefficient of the white surface approximately 25% and may give proper stimulus for easy co-ordination of the ciliary process. The rod cells $8^a$ would be normally stimulated as indicated by the thermometer $8^b$ registering 70, and the flame $8^d$ would represent the expected nerve reaction. However, we now find the cone cells of the retina subjected to one long color wave. The thermometer $8^c$ is shown at 60 which is the approximate meter length of the yellow wave and the flame $8^e$ corresponding to the heat energy, or over stimulation of the cone cells. The use of a yellow sheet however only shifts the nerve tension from one set of cells to another and it is not impossible that the eye, if constantly exposed to this long wave would eventually become partially color blind. Though there might, for a time, be a complete disintegration of the strain and stimulus of the cone cells from the yellow wave, the effect would not persist.

The surface shown in Fig. 9 has been treated to balance the above percentage differences in physiological effect by regulating the amount of intensity and quality of the light reflected. The pupil and lens are normally adjusted, so as to permit the correct amount of light to strike the retina. As shown, the rod and cone cells are evenly stimulated by pre-determined periods of vibration, which result is indicated on thermometer $9^b$ and $9^c$, in accord with flames $9^d$ and $9^e$, indicating the consequent state of normal nerve action. In balancing and regulating the amount, intensity and quality of light reflected from a white surface, the limit of fineness is that beyond which the screening of the white surface is too small to be perceived and the limit of coarseness is that beyond which the total area of white surface exposed and necessary to produce balanced and normal action of the eye is exceeded. While a specific manner of applying the method has been set forth herein, it is to be understood that I claim as a part of my invention all and any modifications which fall fairly within the scope of the appended claims. For example, a specific measure of fineness, having reference to the optical effects of visibility as well as decrease in light reflected or transmitted, is naturally relative to the distance and may be expressed in terms of visual angle as an alternative to fineness of screen. In this connection it should be noticed that the smallest visual angle under which an individual point or points can be separately seen is from 45 seconds to two minutes varying according to the nature of the surface and the amount, intensity and quality of the incident light.

What I claim is:

1. The method of producing a non-glare surface, which consists in dividing said surface into a multiplicity of uniformly distributed circumscribed figures, approximately equal in area, applying a filter to absorb some of the longer waves from a uniformly distributed number of said circumscribed figures, leaving the other uniformly distributed areas normal, so as to produce a uniformly distributed neutral tint mingled with uniformly distributed pure white light undiluted by the tint, the relative areas of the tinted figures and of the untinted figures, and the amount of neutral light and pure white light transmitted therefrom respectively, being regulated so as to produce a resultant normal stimulation of the eye to register the effect of normal illumination only.

2. The method described in claim 1, in which the filtering medium for absorbing long waves is adapted to produce a tint equivalent to blue-green or blue-gray 30 per cent diluted, and the total amount of white light undiluted by tint is adjusted to equal approximately 25 percent to 50 percent of the total surface illumination.

3. The method of producing a non-glare background or surface which consists in dividing the area of the same into a multiplicity of uniformly distributed circumscribed figures, approximately equal in area applying a filter to absorb some of the longer waves from a uniformly distributed number of said circumscribed figures, leaving the other uniformly distributed areas normal, so as to produce a uniformly distributed neutral tint mingled with uniformly distributed pure white light undiluted by the tint, said figures individually being of such dimensions as to be individually invisible at the distance viewed, whereby the effect of uniformly distributed pure white light is obtained over the entire background.

4. The method of decreasing the amount of light transmitted by a medium such as paper which consists in dividing its surface into a multiplicity of uniformly distributed circumscribed figures approximately equal in area, applying a screen or filter to a uniformly distributed number of said circumscribed figures, or areas leaving the other uniformly distributed figures or areas normal, so as to produce a uniformly distributed fractional transmission through the paper of the light.

5. As an improved product, a sheet of material such as paper, having upon its surface a color filter divided into a multiplicity of uniformly distributed circumscribed figures or areas said filter being so arranged as to leave a multiplicity of uniformly distributed circumscribed figures or areas normal for the transmission of light waves incident to the surface, said circumscribed figures or areas being of such dimensions as to be individually invisible to the eye, whereby fractional transmission of light will be effected from the surface as a whole, with the effect of uniformly distributed normal light waves, such as white light.

ALBERT B. HURLEY.